US012783704B2

(12) United States Patent
Winters

(10) Patent No.: US 12,783,704 B2
(45) **Date of Patent: *Nov. 3, 2026**

(54) DATABASE SECURITY

(71) Applicant: Ab Initio Technology LLC, Lexington, MA (US)

(72) Inventor: Christopher J. Winters, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/987,387

(22) Filed: Nov. 15, 2022

(65) Prior Publication Data

US 2023/0075240 A1 Mar. 9, 2023

Related U.S. Application Data

(63) Continuation of application No. 14/933,493, filed on Nov. 5, 2015, now Pat. No. 11,531,775.

(60) Provisional application No. 62/075,593, filed on Nov. 5, 2014.

(51) Int. Cl.

| | |
|---|---|
| ***G06F 21/62*** | (2013.01) |
| ***G06F 16/23*** | (2019.01) |
| ***G06F 16/28*** | (2019.01) |
| ***G06F 21/60*** | (2013.01) |

(52) U.S. Cl.

CPC ...... *G06F 21/6218* (2013.01); *G06F 16/2365* (2019.01); *G06F 16/284* (2019.01); *G06F 21/604* (2013.01); *G06F 21/6227* (2013.01)

(58) Field of Classification Search

None

See application file for complete search history.

(56) References Cited

U.S. PATENT DOCUMENTS

| | | | | |
|---|---|---|---|---|
| 5,966,072 | A | 10/1999 | Stanfill et al. | |
| 6,516,315 | B1 | 2/2003 | Gupta | |
| 6,757,680 | B1 * | 6/2004 | Choy | G06F 16/21 707/999.102 |
| 7,127,448 | B1 * | 10/2006 | Wong | G06F 16/24547 |

(Continued)

FOREIGN PATENT DOCUMENTS

| | | |
|---|---|---|
| CN | 101331495 | 12/2008 |
| CN | 101571858 | 11/2009 |

(Continued)

OTHER PUBLICATIONS

AU Office Action in Australian Appln. No. 2020203287 dated Jun. 3, 2021, 5 pages.

(Continued)

*Primary Examiner* — Jesse P Frumkin

(74) *Attorney, Agent, or Firm* — Fish & Richardson P.C.

(57) ABSTRACT

A method includes automatically determining a component of a security label for each first record in a first table of a database having multiple tables, including: identifying a second record related to the first record according to a foreign key relationship; identifying a component of the security label for the second record; and assigning a value for the component of the security label for the first record based on the identified component of the security label for the second record. The method includes storing the determined security label in the record.

20 Claims, 10 Drawing Sheets

(56) References Cited

U.S. PATENT DOCUMENTS

| | | | |
|---|---|---|---|
| 7,725,501 B1 | 5/2010 | Stillman et al. | |
| 7,904,642 B1 | 3/2011 | Gupta et al. | |
| 8,316,051 B1 | 11/2012 | Burns et al. | |
| 8,732,856 B2 | 5/2014 | Sack et al. | |
| 11,531,775 B2 * | 12/2022 | Winters | G06F 21/604 |
| 2002/0002557 A1 | 1/2002 | Straube et al. | |
| 2003/0191768 A1 * | 10/2003 | Choy | G06F 16/284 |
| 2004/0015701 A1 | 1/2004 | Flyntz | |
| 2004/0044655 A1 | 3/2004 | Cotner et al. | |
| 2004/0054663 A1 | 3/2004 | Goodwin | |
| 2005/0216465 A1 | 9/2005 | Dutta et al. | |
| 2005/0289342 A1 | 12/2005 | Needham et al. | |
| 2006/0059567 A1 | 3/2006 | Bird et al. | |
| 2006/0206485 A1 | 9/2006 | Rubin et al. | |
| 2006/0282433 A1 | 12/2006 | Dutta et al. | |
| 2007/0011668 A1 | 1/2007 | Wholey et al. | |
| 2007/0174285 A1 | 7/2007 | Dutta et al. | |
| 2008/0010233 A1 | 1/2008 | Sack et al. | |
| 2008/0235231 A1 | 9/2008 | Gass et al. | |
| 2009/0043775 A1 | 2/2009 | Cotner et al. | |
| 2009/0050695 A1 * | 2/2009 | Ma | G06F 21/6227 235/382 |
| 2009/0063490 A1 | 3/2009 | Fuerst et al. | |
| 2009/0199273 A1 | 8/2009 | Yalamanchi | |
| 2010/0180339 A1 * | 7/2010 | Finlayson | G06F 21/6218 726/21 |
| 2010/0263060 A1 | 10/2010 | Charbonneau et al. | |
| 2011/0162076 A1 | 6/2011 | Song et al. | |
| 2011/0231889 A1 | 9/2011 | Dheap et al. | |
| 2011/0238984 A1 | 9/2011 | Roush et al. | |
| 2012/0246150 A1 | 9/2012 | Comi et al. | |
| 2012/0330925 A1 | 12/2012 | Ramamurthy et al. | |
| 2013/0047196 A1 | 2/2013 | Gong et al. | |
| 2013/0173669 A1 | 7/2013 | Tang et al. | |
| 2013/0298259 A1 | 11/2013 | Mattsson et al. | |
| 2013/0325841 A1 | 12/2013 | Ahmed et al. | |
| 2014/0007180 A1 | 1/2014 | Agrawal et al. | |
| 2014/0101777 A1 | 4/2014 | Kim | |
| 2015/0205977 A1 | 7/2015 | Rundle et al. | |
| 2016/0104002 A1 | 4/2016 | Schneider et al. | |

FOREIGN PATENT DOCUMENTS

| | | |
|---|---|---|
| CN | 103560994 | 2/2014 |
| GB | 2509032 | 6/2014 |
| JP | 2004021449 | 1/2004 |
| JP | 2006-502472 | 1/2006 |
| JP | 2006-106986 | 4/2006 |
| WO | WO 2010/106679 | 9/2012 |

OTHER PUBLICATIONS

AU Office Action in Australian Appln. No. 2020203287 dated May 10, 2022, 4 pages.

CA Office Action in Canadian Appln. No. 2,966,537, dated Dec. 31, 2020, 6 pages.

CN Office Action in Chinese Appln. No. 201580061313.0, dated Sep. 23, 2020, 9 pages (with English translation).

Gao, Lijie, Ze Jin, Lianzhong Liu, and Chunyan Han. "A fine-grained access control model with secure label on data resource." In Computer Science and Network Technology (ICCSNT}, 2013 3rd International Conference on, pp. 14-18. IEEE, 2013. (Year: 2013).

IN Office Action in Indian Appln. No. 201717018800, dated Mar. 11, 2021, 6 pages.

International Preliminary Report on Patentability in PCT/US2015/059213, mailed May 9, 2017, 6 pages.

International Search Report and Written Opinion in PCT/US2015/059213, mailed Jan. 15, 2016, 8 pages.

Japanese Office Action in Appln. No. 2017522954, dated Aug. 28, 2019, 6 pages (with English translation).

Needham, "Oracle Label Security in government and Defense Environments." Mar. 2009 Oracle Corporation.

Office Action in Canadian Appln. No. 2,966,537, dated Jun. 15, 2021, 6 pages.

Qian, Xiaolei. "View-based access control with high assurance." In Security and Privacy, 1996. Proceedings., 1996 IEEE Symposium on, pp. 85-93. IEEE, 1996. (Year: 1996).

Servos, Daniel, and Sylvia L. Osborn. "HGABAC: Towards a formal model of hierarchical attribute-based access control." In International Symposium on Foundations and Practice of Security, pp. 187-204. Springer, Cham, 2014. (Year: 2014).

Office Action in Australian Appln. No. 2022203757, mailed on Apr. 14, 2023, 3 pages.

* cited by examiner

950

Delivery 910

| label | delivery | origin | destination | transport | sponsor |
|---|---|---|---|---|---|
| U:NA | D1 | New York | Chicago | plane | |
| S:NA | D2 | New York | White Sands | plane | |
| U:EU,NA | D3 | New York | London | plane | |
| U:EU,NA | D4 | London | New York | plane | |
| S:EU,NA | D5 | New York | London | submarine | |
| S:EU,NA | D6 | New York | London | | |
| S:EU,NA | D7 | New York | London | plane | Mr. X |

Site 920

| label | site | region | classification |
|---|---|---|---|
| U:NA | New York | North America | U |
| U:NA | Chicago | North America | U |
| U:EU | London | Europe | U |
| S:NA | White Sands | North America | S |

Region 930

| label | region | region_code |
|---|---|---|
| -:NA | North America | NA |
| -:EU | Europe | EU |

Transport 940

| label | transport | classification |
|---|---|---|
| U:- | plane | U |
| S:- | submarine | S |

Sponsor 960

| label | sponsor |
|---|---|
| S:- | Mr. X |
| S:- | Mr. Y |

FIG. 2A

| | User1 | User2 | User3 | User4 |
|---|---|---|---|---|
| | U:NA | U:EU,NA | S:NA | S:EU,NA |
| -:- | 1 | 1 | 1 | 1 |
| -:NA | 1 | 1 | 1 | 1 |
| -:EU,NA | 0 | 1 | 0 | 1 |
| U:- | 1 | 1 | 1 | 1 |
| U:NA | 1 | 1 | 1 | 1 |
| U:EU,NA | 0 | 1 | 0 | 1 |
| S:- | 0 | 0 | 1 | 1 |
| S:NA | 0 | 0 | 1 | 1 |
| S:EU,NA | 0 | 0 | 0 | 1 |

FIG. 2B

DATABASE SECURITY

CLAIM OF PRIORITY

This application is a continuation of U.S. patent application Ser. No. 14/933,493, filed on Nov. 5, 2015, which claims priority to U.S. Provisional Patent Application Ser. No. 62/075,593, filed on Nov. 5, 2014, the entire contents of which are incorporated herein by reference.

BACKGROUND

This description relates to database security. A database can include multiple tables, each of which can include multiple rows. Access to the data records stored in the database can be controlled by controlling access to each of the tables or by controlling access to each row within a table. Row-level security can be provided through the use of security labels associated with each object, such as each row.

SUMMARY

In an aspect, a method includes automatically determining a component of a security label for each first record in a first table of a database having multiple tables, including: identifying a second record related to the first record according to a foreign key relationship; identifying a component of the security label for the second record; and assigning a value for the component of the security label for the first record based on the identified component of the security label for the second record. The method includes storing the determined security label in the record.

Embodiments can include one or more of the following features.

The method includes identifying multiple second records each related to the first record according to a respective foreign key relationship; identifying a component of the security label for each of the second records; and assigning the value for the component of the security label for the first record based on a value for each of the identified components of the security label for the second records.

Assigning the value for the component of the security label for the first record includes concatenating multiple distinct values for the identified components of the security label for the second records.

Assigning a value for the component of the security label includes identifying a highest priority value from among the values for the identified components of the security label for the second records; and assigning the highest priority value as the value for the component of the security label for the first record.

The method includes automatically determining a component of a security label for each third record in a third table of the database based on an attribute of the record, an attribute of a record being a value stored in the record.

The method includes automatically determining a component of a security label for each third record in a third table of the database based on a value associated with the third table.

The second record is in a table other than the first table.

The component is a first component of the security label for the record, and wherein the method includes determining a second component of the security label.

The method includes updating the component of the security label for a particular first record responsive to a trigger event.

The trigger event includes a change in the foreign key relationship.

The trigger event includes a change in the component of the security label for the second record related to the particular first record.

The method includes detecting the trigger event.

The method includes receiving a notification of the trigger event.

The method includes receiving a request for access to a particular first record from a user, the user being associated with a user security code.

The method includes restricting access by the user to the particular first record based on a comparison between a component of the user security code associated with the user and the component of the security label for the particular first record.

The method includes determining the security label for the record prior to receiving the request for access.

The method includes automatically determining the component of the security label for a particular first record when the first record is received for storage in the database.

In an aspect, a non-transitory computer-readable medium stores instructions for causing a computing system to automatically determine a component of a security label for each first record in a first table of a database having multiple tables, including: identifying a second record related to the first record according to a foreign key relationship; identifying a component of the security label for the second record; and assigning a value for the component of the security label for the first record based on the identified component of the security label for the second record; and storing the determined security label in the record.

In an aspect, a computing system includes a processor coupled to a memory, the processor and memory configured to: automatically determine a component of a security label for each first record in a first table of a database having multiple tables, including: identifying a second record related to the first record according to a foreign key relationship; identifying a component of the security label for the second record; and assigning a value for the component of the security label for the first record based on the identified component of the security label for the second record; and storing the determined security label in the record.

In an aspect, a computing system includes means for automatically determining a component of a security label for each first record in a first table of a database having multiple tables, including: identifying a second record related to the first record according to a foreign key relationship; identifying a component of the security label for the second record; and assigning a value for the component of the security label for the first record based on the identified component of the security label for the second record; and means for storing the determined security label in the record.

In an aspect, a method includes determining that a first record stored in a first table of a database having multiple tables has been updated; automatically updating a first security label for the first record; storing the updated security label in the record; and automatically updating a second security label for a second record stored in a second table of the database, the second record being related to the first record according to a foreign key relationship.

Embodiments can include one or more of the following features.

The method includes determining whether the update to the first record affects the first security label for the first record.

The method includes determining which one or more components of multiple components of the first security label are affected by the update to the first record; and automatically updating the affected one or more components of the first security label.

The second table is a child of the first table.

The method includes determining whether the update to the first record affects the foreign key relationship.

The method includes determining which one or more foreign key relationships of multiple foreign key relationships are affected by the update to the first record; and automatically updating the second security label for each second record related to the first record according to the affected foreign key relationship.

In an aspect, a non-transitory computer-readable storing medium stores instructions for causing a computing system to: determine that a first record stored in a first table of a database having multiple tables has been updated; automatically update a first security label for the first record; store the updated security label in the record; and automatically update a second security label for a second record stored in a second table of the database, the second record being related to the first record according to a foreign key relationship.

In an aspect, a computing system includes a processor coupled to a memory, the processor and memory configured to: determine that a first record stored in a first table of a database having multiple tables has been updated; automatically update a first security label for the first record; store the updated security label in the record; and automatically update a second security label for a second record stored in a second table of the database, the second record being related to the first record according to a foreign key relationship.

In an aspect, a computing system includes means for determining that a first record stored in a first table of a database having multiple tables has been updated; means for automatically updating a first security label for the first record; means for storing the updated security label in the record; and means for automatically updating a second security label for a second record stored in a second table of the database, the second record being related to the first record according to a foreign key relationship.

Other features and advantages are apparent from the following description and from the claims.

BRIEF DESCRIPTION OF DRAWINGS

FIG. 2A is an example of a database system.
FIG. 2B is an example of user access restrictions.

DETAILED DESCRIPTION

Figure 1:
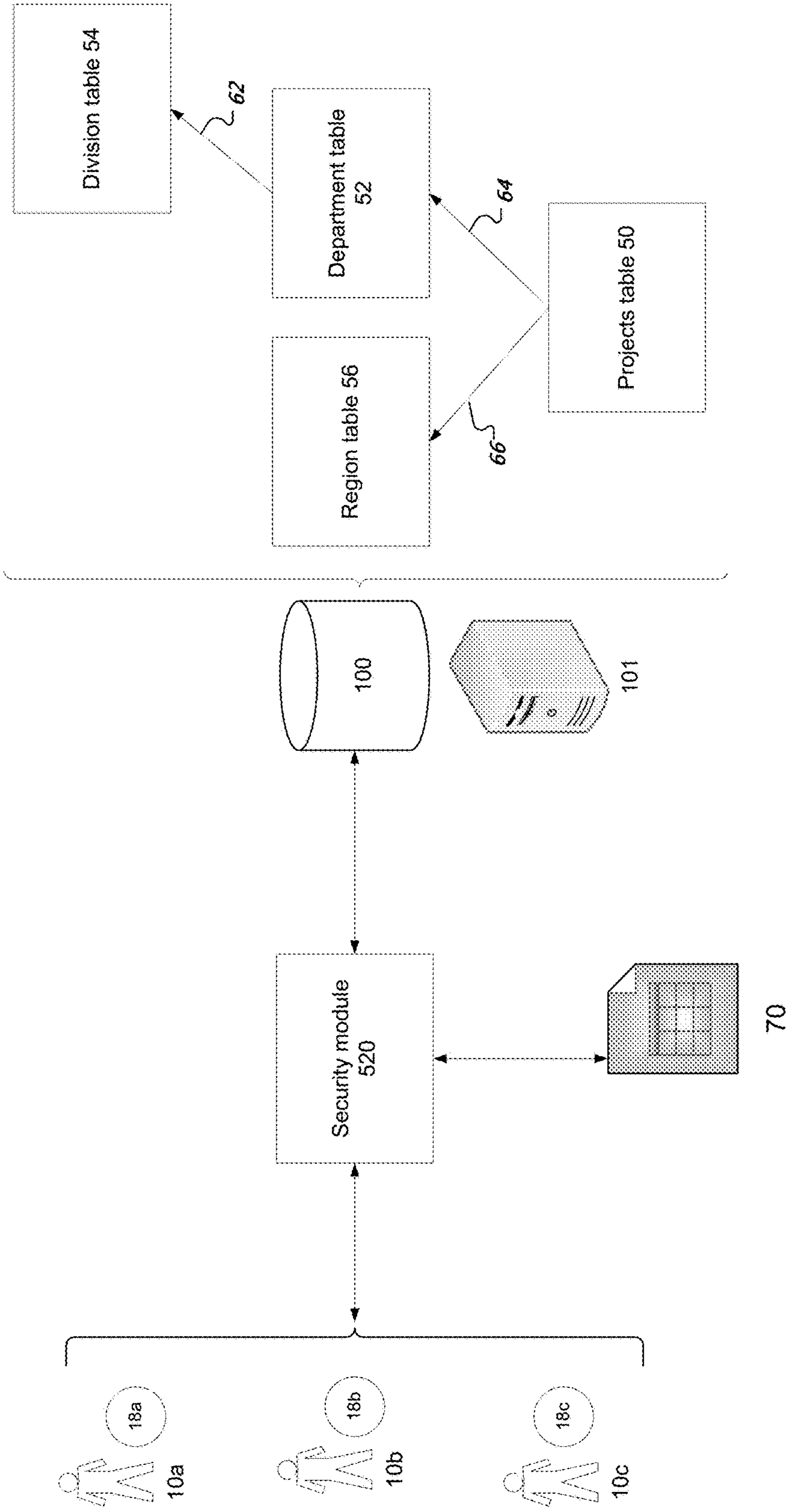
FIG. 1 is a block diagram.

We describe here an approach to providing row-level security to rows in a table of a database. Each row in the table represents a data record. A security label is stored in each row and can be used to for controlling access to the row, e.g., to indicate which users have permission to access the data record represented by the row or which users are restricted from accessing the data record represented by the row. The security label for a row in a table can be determined based on one or more of information that is external to the row, information that is internal to the row, and information that is specific to the table. Propagation of security labels, also sometimes referred to as inheritance, is a mechanism for determining the security label of a row based at least in part on the security label of one or more related rows. For instance, a row in a table of a database can inherit a component of its security label from another row in the same table or in another table that is related to the row via a foreign key relationship. Inheritance of security labels can help ensure, for instance, that if a user is restricted from accessing a given data record, then that user is also restricted from accessing any other data records that depend on the given data record.

The security label for a row can have multiple components. One or more of the components of the security label for a row in a table can be determined based on information that is external to the row, such as information in a related row of the same table or information in a related row of another table. One or more of the components of the security label for a row can be determined based on information within the row, such as an attribute of the row. One or more of the components of the security label for a row in a table can be determined based on table-specific information, such as a constant value associated with the table.

The security label for a data record (we sometimes use the terms row and data record interchangeably) can be determined when the data record is input into the database. The security label for a data record can be updated in response to a triggering event, such as a change in the data record, a change in a related data record, or a change in the table-specific information. The security label is stored in the data record such that the security label is already computed and available before any request for access to the row is received. We sometimes refer to the computation of a security label prior to and independent of receiving any request for access to the row as pre-computation of the security label. Pre-computation of the security label can have advantages. For instance, if the security label for a row is pre-computed, a determination of whether a user is restricted from accessing the row can be made quickly without having to undertake a computationally expensive process of calculating the security label in real time responsive to an access request.

The approach to row-level security described here enables data to be secured in a database that has multiple, interrelated tables. In such a database, the security labels for the rows in one table can be determined at least in part based on the security labels for the rows in another, related table. For instance, if a user is restricted from viewing a data record representative of a project summary, he can automatically be prevented from viewing a data record representative of the project finances as well, due to a relationship between the data records representative of the project summary and the project finances. If there are many rows in the database that are to be secured, but much of the security can be inferred from other, related rows, then determining security labels based on these relationships can help improve security and reduce maintenance costs.

The pre-computation of security labels and the storage of security labels in data records enables the security of the data records to be easily understandable and efficiently accessible. This ready access to security information can help facilitate audits of a database system, can assist security or information technology professionals in troubleshooting, and can facilitate other activities that involve understanding the permissions or restrictions associated with individual data records in a database. For instance, by storing the security label for a data record in the data record itself, an auditor or security professional can determine which users are permitted to access or restricted from accessing the data record by examining the record, without having to undertake a complex calculation and without having to reference a separate security file or table.

Referring to FIG. 1, a database 100 hosted on a server 101 can include one or more tables 50, 52, 54, 56, each of which includes one or more data records. A table can be related to one or more of the other tables in the database 100, e.g., in a hierarchical relationship or another type of relationship. The relationship between two tables can be, e.g., a parent-child relationship in which a child table is dependent on one or more parent tables. For instance, in the example of FIG. 1, the department table 52 is a child of the division table 54, as indicated by an arrow 62. The projects table 50 is a child of both the division table 54 and the region table 56, e.g., as indicated by arrows 64 and 66. We sometimes refer to a parent table as an upstream table and a child table as a downstream table. Other types of relationships between tables are also possible.

A security module 520 determines whether a user 10 is permitted to access or restricted from accessing the data records in the database 100. By a user 10, we mean any person or entity that attempts to access a data record in the database 100. FIG. 1 shows three specific users 10*a*, 10*b*, 10*c*. A user security code 18 can be associated with each user 10, e.g., based on the user's role (e.g., project manager, department manager, executive, or another role), the user's location (e.g., northeast division, west division, or another location), the user's security clearance (e.g., top secret, secret, public, or another clearance), the user's department (e.g., human resources, engineering, marketing, or another department), or another characteristic. When a user 10 requests access to a particular data record in the database 100, the security module 520 determines whether the user 10 is allowed to access or is restricted from accessing the particular data record based on a comparison between the user's user security code 18 and the security label of the particular data record. Because the security label of the particular data record has already been calculated before receiving the user's request for access, the security module 520 can quickly determine whether the user is to be restricted from accessing the data record without having to undertake the potentially computationally expensive process of determining the security label for the row.

Access to the database 100 can be restricted on a row-by-row basis. For instance, each row in a table can have its own, individualized security label that is independent from the security label for each of the other rows in the same table and independent from the security label for each of the rows in other tables in the database 100. The security label for a row can be a consolidated security label having one or more components, each of which is determined independently based on information internal to the row, information external to the row, information specific to the table, or a combination of any two or more of them. The security label for each row can be stored in a field in the row itself. Each component of the security label for a data record can represent restrictions on user access to the data record or permissions for user access to the data record. The security module 520 can determine whether one or more components of the security label stored in a particular data record restricts a user with a particular user security code 18 from accessing the particular data record.

In some examples, a component of the security label for a data record is determined based on information internal to the data record, such as one or more attributes of the data record. An attribute of a data record is a value, such as a numerical value, a string, or another type of value, stored in a field of the data record. Attributes can represent information such as roles (discussed below), users, groups of users, business labels, inputs to functions, or other information. In an example, an attribute of a data record can be an identifier of a corporate division represented by the data record, and a component of the security label for the data record can be determined based on the identifier of the corporate division. In an example, an attribute of a data record can be a clearance value, which indicates whether the data record is top secret (TS), secret (S), or public (P), and a component of the security label for the data record can be determined based on the clearance value. In some examples, a single component of a security label for a data record can be determined based on multiple attributes, such as based on both the identifier of the corporate division represented by the data record and the clearance value for the data record. In some examples, multiple components of a security label for a data record can each be determined based on a corresponding attribute.

In some examples, a component of the security label for a data record is determined based on information external to the data record, such as a component of a security label for a related data record in the same table or in a different table. A data record in one table can be related to a row in the same table or in a different table through a foreign key relationship. A foreign key is a value stored a first data record that uniquely identifies a second data record, thus establishing a link between the first and second data records. The first and second data records can be in the same table or in different tables. We sometimes refer to rows that are related, e.g., through a foreign key relationship or another type of relationship, as related rows and to the determining of a component of a security label based on information in a related row in a different table as inheritance of the component of the security label. In an example, each data record in a child table represents a project and is related via a foreign key relationship to a data record in a parent table that represents a corporate division. Each data record in the project table inherits a component of its security label from a corresponding component of the security label of the related data record in the corporate division table. Inheritance of security labels can allow high-level access restrictions to propagate to lower-level tables. For instance, with inheritance of security labels, if a user is restricted from accessing a data record representing the Engineering division in the corporate division table, the user will also be restricted from accessing any data record representing a project data record in the project table that is related to the Engineering division.

In some examples, a component of the security label for a data record is constant for all data records belonging to a given table. For instance, all data records in a given table can have a constant value as a component of the security label, the constant value being an attribute of the table. In an example, in a table including data records representative of employees' salaries, all data records can have a "confidential" component of the security label.

A component of a security label for a row can be based on values inherited from multiple other rows. In some examples, the multiple values obtained from the other rows are concatenated to form the component of the security label for the row. The multiple values can be concatenated in alphabetical order, in numerical order, in an order based on the relationships between the row and each other row, or in another order. In some examples, the multiple values can be part of an ordered or hierarchical list and only a single, highest priority value from among the multiple values is used as the component of the security label for the row. For instance, if one related row has a component with a high priority value (e.g., “TS”) and another related row has a component with a lower priority value (e.g., “S”), the inherited component based on these two rows will take on the high priority value (“TS”).

A component of a security label for a row can be based on multiple factors. In an example, a component of a security label for a row can be based on both an attribute of the row and a value inherited from a related row. The component of the security label can be a concatenation of the attribute and the inherited value, can take on the higher priority value from among the attribute and the inherited value, or can be combined in another way.

A security label for a row can have multiple components (sometimes referred to as a consolidated security label), each component determined independently from each other component. A security label for a row can include one or more components determined based on an attribute of the row, one or more components determined by inheritance, one or more components determined based on table-specific information, or a combination of any two or more of them.

Some foreign key relationships can be nullable, meaning that the foreign key can be missing for a data record without causing an error. When a component of a security label is determined by inheritance via a nullable foreign key, a default option for that component can be specified. The default option can be to assign a default value to the component of the security label; to ignore the foreign key relationship, leaving the component of the security label blank; or to determine the value for the component based on other factors. Some foreign key relationships can be non-nullable, meaning that an error results if there is no value for the foreign key. When a component of a security label is determined by inheritance via a non-nullable foreign key, a default is not specified.

One or more table-specific rules specify how each component of a security label is determined for each record in the table. The table-specific rules can specify, for each component of a security label of each data record in the table, one or more of an attribute, a foreign key, and a constant to be used in determining the component of the security label. The table-specific rules can specify whether multiple values are to be concatenated, treated as a hierarchy or ordered list, or otherwise. The table-specific rules can specify a default in the event that a foreign key relationship is null. Other rules can also be specified.

In some examples, a translation table, such as a lookup table, can be used to simplify a component of a security label. A translation table maps each of a set of values or combinations of values to a corresponding value of another set of values. A translation table can be useful, e.g., if a single component of a security label may include a large number of concatenated values. Such a component can become complex and unwieldy. The translation table can map each possible combination of concatenated values to a simpler expression, such as a single value, which single value can be used as a surrogate value in the security label.

In some examples, the security label for a data record is determined when the data record is input into the database 100. In some examples, one or more components of the security label for a data record are updated when a change is made to the data record or to a related data record that may cause a change in a component of the security label for the data record. For instance, when an attribute of the data record is changed, the component of the security label that is determined based on the attribute can be updated. When a foreign key is changed, the component of the security label that is determined by inheritance via that foreign key can be updated. When a change is made to an upstream data record related via foreign key to a downstream data record, the component of the security label of the downstream data record that is determined by inheritance via that foreign key can be updated. When an upstream data record related via foreign key to a downstream data record is deleted, the component of the security label of the downstream data record that is determined by inheritance via that foreign key can be updated. Other circumstances can also trigger an update of the security label for a data record.

The security label for a row can be used to restrict access to the row. Each user of the database system has a user security code, which can include the same components as the security label for a data record in the database. When a user attempts to access a row, each component of the user's user security code is compared to the corresponding component of the security label of the row. If any of the components prohibits access to the row by the user, the user is restricted from accessing the row.

In some examples, a component of the security label of a row is formed by concatenating one or more values. A user is restricted from accessing a row whose security label includes one or more values that are not included in the user's user security code. For instance, a particular row may have a security label with a component including the concatenated values “A,B,C.” A user whose user security code includes the values “A,B” for the corresponding component is restricted from accessing that row. A user whose user security code includes the values “A,B,C,D” for the corresponding component may be permitted to access that row, depending on the outcome of a comparison between each other component of the user security code and the corresponding component of the security label of the row.

In some examples, the values that can form a component of the security label of a row are part of an ordered or hierarchical list. A user having a given value for the corresponding component of the user's user security code is restricted from accessing any row having a higher priority value than the user's value. For instance, the value of a component of a security label may be selected from the ordered list “TS,” “S,” “P,” where “TS” is the highest priority value and “P” is the lowest priority value. A particular row may have a security label having a component with the value “S.” A user whose user security code has the value “P” for the corresponding component is restricted from accessing that row. A user whose user security code has the value “TS” or “S” may be permitted to access the row, depending on the outcome of a comparison between each other component of the user security code and the corresponding component of the security label of the row.

In some examples, one or more of the components of the user security code 18 for the user 10 can be based on the user's role. By role, we mean a position held by the user, such as a job position, a set of responsibilities, a position relative to others, or another type of position. Example roles can include executive roles, managerial roles, professional staff roles, support roles, or other roles. For instance, as in the example of FIG. 1, the division executive 10*a*, the production worker 10*b*, and the department manager 10*c* each have a different value for each of one or more components of the user security code 18 which is based on each user's role within the company.

In some examples, a first role can imply one or more other roles, meaning that if a user is assigned the first role, the user is also automatically assigned the one or more other roles. The user is then also associated with any user security code for those one or more other roles. For instance, the division executive role can imply a department manager role. As a result, any user with the division executive role (e.g., the user 10*a*) can automatically be assigned the department manager role and thus can be associated with any user security codes for the department manager role.

Referring to FIG. 2A, entries in an example database system 950 have security labels having two distinct components. The database system 950 stores data representative of the origin, destination, and means of transport for each delivery managed by Very Special Deliveries, Inc. The database system 950 includes multiple tables related in a hierarchical relationship by way of foreign keys. Data records in a Delivery table 910 store data representative of the origin, destination, means of transport, and sponsor for each delivery. The origin and destination fields in each record in the Delivery table 910 are each related by foreign key relationship to a record in a Site table 920, and the records in the Site table are each related by foreign key relationship to a record in a Region table 930. The transport field in each record in the Delivery table 910 is related by foreign key relationship to a Transport table 940. The sponsor field in each record in the Delivery table 910 is related by foreign key relationship to a Sponsor table 960. In this example, only fields involved in security are shown. Data records can have additional attributes, foreign keys, or both that are not involved in the determination of a security label, and which are not shown in FIG. 2A.

Permissions in the database system 950 are constrained by consolidated security labels having two distinct, independent components: a classification component and a location component (expressed in the form classification:location). In this example, the classification component takes on a single value selected from an ordered list having a low-priority value (U) and a high-priority value (S). The location component can take on one or more values (NA or EU); if the location component includes multiple values, the values are concatenated in an alphabetized list.

In the Transport table 940, the classification component of the security label for each record is determined based on the "classification" attribute of the record. If the "classification" attribute is "U" then the classification component of the security label takes on the value "U" and if the "classification" attribute is "S" then the classification component of the security label takes on the value "S." The records in the Transport table 940 do not have values for the location component of the security label. The security label determination for the Transport table 940 can be implemented with code executed by the security module 520, e.g., code indicating that the value in the "classification" field is to be included in the classification component of the security label for data records in the Transport table 940.

In the Region table 930, the location component of the security label for each record is determined based on the "region_code" attribute of the record. If the "region_code" attribute is "NA" then the location component of the security label takes on the value "NA" and if the "region_code" attribute is "EU" then the location component of the security label takes on the value "EU." The records in the Region table 930 do not have values for the classification component of the security label. The security label determination for the Region table 930 can be implemented with code executed by the security module 520, e.g., code indicating that the value in the "region_code" field is to be included in the classification component of the security label for data records in the Region table 930.

The classification component of the security label for all records in the Sponsor table 960 takes on the value "S." The value "S" is a table-specific constant that applies to all records in the Sponsor table 960, regardless of attributes of the records or foreign key relationships for the records. The security label determination for the Sponsor table 960 can be implemented with code executed by the security module 520, e.g., code indicating that the value "S" is always to be included in the classification component of the security label for data records in the Sponsor table 960.

The records in the Site table 920 have both a classification component and a location component of the security label. The classification component of the security label for each record is determined based on the "classification" attribute of the record. The determination of the classification component for each data record in the Site table 920 can be implemented with code executed by the security module 520, e.g., code indicating that the value in the "classification" field is to be included in the classification component of the security label for data records in the Site table 920.

The location component of the security label for each record in the Site table 920 is determined by inheritance. Each record in the Site table 920 is related to a record in the Region table 930 via a foreign key relationship through the value in the "region" field. Each Site record inherits the location component of its security label from the location component of the security label of the related Region record. For instance, the New York, Chicago, and White Sands Site records inherit the "NA" location component from the North America Region record and the London Site record inherits the "EU" location component from the Europe Region record. The determination of the location component for each data record in the Site table 920 can be implemented with code executed by the security module 520, e.g., code indicating that the foreign key to the Region table 930 is to be respected.

The foreign key relationship to the Region table 930 is nullable, meaning that the "region" field can be blank without causing an error. In this example, if the foreign key relationship is null for a given data record (e.g., if there is no value in the "region" field for that data record), the security label is determined by default to be "S" in the classification component and no value in the location component. Because "S" is the high priority value for the classification component, the default ensures that the classification component will take on the value "S" regardless of the value of the classification attribute for the data record. The default behavior for a nullable foreign key can be implemented with code executed by the security module 520, e.g., code indicating that the security label is to be "S:—" if the foreign key relationship to the Region table 930 is null.

Both the classification component and the location component of the security label for data records in the Delivery table 910 are determined by inheritance. Each record in the Deliver table 910 is related via foreign key relationship to one or more other records in other tables, including the Site table 920 (via the "origin" and "destination" fields as foreign keys), the Transport table 940 (via the "transport" field as a foreign key), and the Sponsor table 960 (via the "sponsor" field as a foreign key).

The classification component takes on a single value based on an ordered list in which "U" is the low-priority value and "S" is the high-priority value. The classification component for a given data record is assigned the value that is the highest priority value for the classification component in each of the related data records. Thus, for a given data record, if any of the related data records has a classification component with a value of "S," the given data record is assigned a value of "S" for the classification component.

The location component takes on all of the values of the location components for the related data records, concatenated in alphabetical order. Thus, for a given data record, if one of the related data records has a location component with a value of "NA" and another one of the related data records has a location component with a value of "EU," then the given data record is assigned a value of "EU,NA" for the location component.

In this example, the foreign keys to the Transport table 940 and the Sponsor table 960 are nullable. A default is provided for each nullable foreign key. If the foreign key to the Transport table 940 is null for a given data record (e.g., if there is no value for the "transport" field for that data record), the security label is determined by default to be "S" in the classification component and no value in the location component. The foreign keys to the Site table 920 are not nullable. If either foreign key to the Site table 920 is null for a given data record (e.g., if there is no value for the "origin" or "destination" field for that data record), an error occurs.

The determination of the security label for each data record in the Delivery table 910 can be implemented with code executed by the security module 520 identifying each foreign key relationship to be respected and specifying treatment of nulls:

respect FK to origin Site (non-nullable)
respect FK to destination Site (non-nullable)
respect FK to Transport (use "5:—" if null)
respect FK to Sponsor (ignore if null)

Specifically, the classification component for the D1 delivery record is assigned as the highest priority value among the classification components for the related records: New York ("U"), Chicago ("U"), and plane ("U"). The "sponsor" field is null and thus the foreign key relationship to the Sponsor table 960 is ignored. The classification component for the D1 record is thus assigned the value "U." The location component for the D1 delivery record is determined by concatenating each distinct value for the location components of the related records: New York ("NA") and Chicago ("NA"). Because the value for the location component is the same for all related records, no concatenation is necessary, and the location component for the D1 delivery record is assigned the value "NA." The consolidated security label for the D1 delivery record is "U:NA."

The classification component for the D2 delivery record is assigned as the highest priority value among the classification components for the related records: New York ("U"), White Sands ("S"), and plane ("U"). The "sponsor" field is null and thus the foreign key relationship to the Sponsor table 960 is ignored. "S" is a higher priority value than "U" and thus the classification component for the D2 record is assigned the value "S." The location component for the D2 delivery record is determined by concatenating each distinct value for the location components of the related records: New York ("NA") and White Sands ("NA"). The consolidated label for the D2 delivery record is thus "S:NA."

The classification component for the D3 delivery record is assigned as the highest priority value among the classification components for the related records: New York ("U"), London ("U"), and plane ("U"). The "sponsor" field is null and thus the foreign key relationship to the Sponsor table 960 is ignored. Thus, the classification component for D3 is assigned the value "U." The location component for the D3 delivery record is determined by concatenating each distinct value for the location components of the related records: New York ("NA") and London ("EU"). The two location component values are concatenated in alphabetical order to form the location component value for the D3 delivery record: "EU,NA." The consolidated label for the D3 delivery record is thus "U:EU,NA." Similarly, the consolidated label for the D4 delivery record is also "U:EU,NA."

The classification component for the D5 delivery record is assigned as the highest priority value among the classification components for the related records: New York ("U"), London ("U"), and submarine ("S"). The "sponsor" field is null and thus the foreign key relationship to the Sponsor table 960 is ignored. "S" is a higher priority value than "U" and thus the classification component for the D5 record is assigned the value "S." The location component for the D5 delivery record is determined by concatenating each distinct value for the location components of the related records: New York ("NA") and London ("EU"). The consolidated label for the D3 delivery record is thus "S:EU,NA."

The D6 delivery record has a null foreign key relationship for the transport field and thus the classification component for the D6 record is "S" by default, regardless of the values of the classification component for the related records. The location component for the D6 delivery record is determined by concatenating each distinct value for the location components of the related records: New York ("NA") and London ("EU"). The consolidated label for the D6 delivery record is thus "S:EU,NA."

The classification component for the D7 delivery record is determined by selecting the highest priority classification component value in the related records having a classification component: New York ("U"), London ("U"), plane ("U"), and sponsor ("S"). "The classification component for D7 is thus assigned the value "S." The location component for the D7 delivery record is determined by concatenating each distinct value for the location components of the related records: New York ("NA") and London ("EU"). The consolidated label for the D7 delivery record is thus "S:EU, NA."

Referring to FIG. 2B, each user of the database system 950 shown in FIG. 2A has a user security code having two distinct, independent components: a classification component and a location component (expressed in the form classification:location). When a user attempts to access a data record in the database system 950, the value for the classification component of the user's user security code is compared to the value for the classification component of the security label of the data record, and the value for the location component of the user's user security code is compared to the value for the location component of the security label of the data record. If either the classification component or the location component prohibits access to the row by the user, the user is restricted from accessing the row.

The classification component and location component of a user security code can each take on the same values available to the classification component and location component, respectively, of a security label of a data record. For instance, the classification component of the user security code can be assigned either the high priority value of "S" or the low priority value of "U." The location component of the user security code can be assigned "NA," "EU," or "NA, EU."

If the classification component of a user's user security code has the value "U," the user is restricted from accessing any data record whose security label has a higher priority value for the classification component (e.g., "S"), regardless of the values for the location components of the user security code and the security label of the data record. If the classification component of a user's user security code has the value "S," the user may be permitted to access a data record having either "U" or "S" for the classification component of its security label, depending on the values for the location components of the user security code and the security label of the data record. If the classification component of the security label of the data record is blank, there are no restrictions imposed by the classification component, and the user's access to the data record is controlled by the location components.

If the location component of a user's user security code has the value "NA," the user is restricted from accessing any data record whose security label has a location component with any value other than "NA." Thus, for instance, that user would be restricted from accessing a data record whose security label has a location component with the value "EU" or "EU,NA." If the location component of a user's user security code has the value "EU,NA," the user may be permitted to access a data record having either "NA," "EU," or "EU,NA" for the location component of its security label, depending on the values for the classification component of the user security code and the security label of the data record. If the location component of the security label is blank, there are no restrictions imposed by the location component, and the user's access to the data record is controlled by the classification components.

A user is restricted from accessing a data record if either the classification component or the location component restricts access by the user to that data record. For instance, User1, with a user security code of "U:NA," is restricted from accessing any data record whose security label has an "S" for the classification component and any data record whose security label includes any value other than "NA" in the location component. User2, with a user security code of "U:EU,NA," is restricted from accessing any data record whose security label has an "S" for the classification component, but has no restrictions on the value of the location component. User3, with a user security code of "S:NA," has no restrictions on the value of the classification component, but is restricted from accessing any data record whose security label includes any value other than "NA" in the location component. User4, with a user security code of "S:EU,NA," has no restrictions on access to the data records.

In this example, the security label for each entry has one ordered component (the classification component) and one non-ordered component (the location component). In some examples, a security label can have multiple ordered or hierarchical components, multiple non-ordered components, or both.

In this example, inheritance of the components of the security label carries through multiple generations of the table hierarchy. By extension, if the Delivery table 910 had a child table, such as a DeliveryItem table, whose entries were related by foreign key relationship to the entries of the Delivery table 910, the label inheritance would continue into the DeliveryItem table in a manner similar to that described above.

Storing the security label for a row within the row itself access restrictions for that row to be quickly and easily determined. For instance, when a user attempts to access a row, the user's ability to access a particular row can be determined by a straightforward comparison between the security label for the row and the user security code for the user, without needing to identify related rows or calculate the security label in real time (e.g., while the user is attempting to access the row). This approach can thus provide for quicker and more reliable access to security-protected rows in a database. Storing the security label for a row within the row itself also facilitates security audits or maintenance of security settings, because the security label is visible and easily understandable without the need for references to other tables or complex logical determinations.

Figure 3:
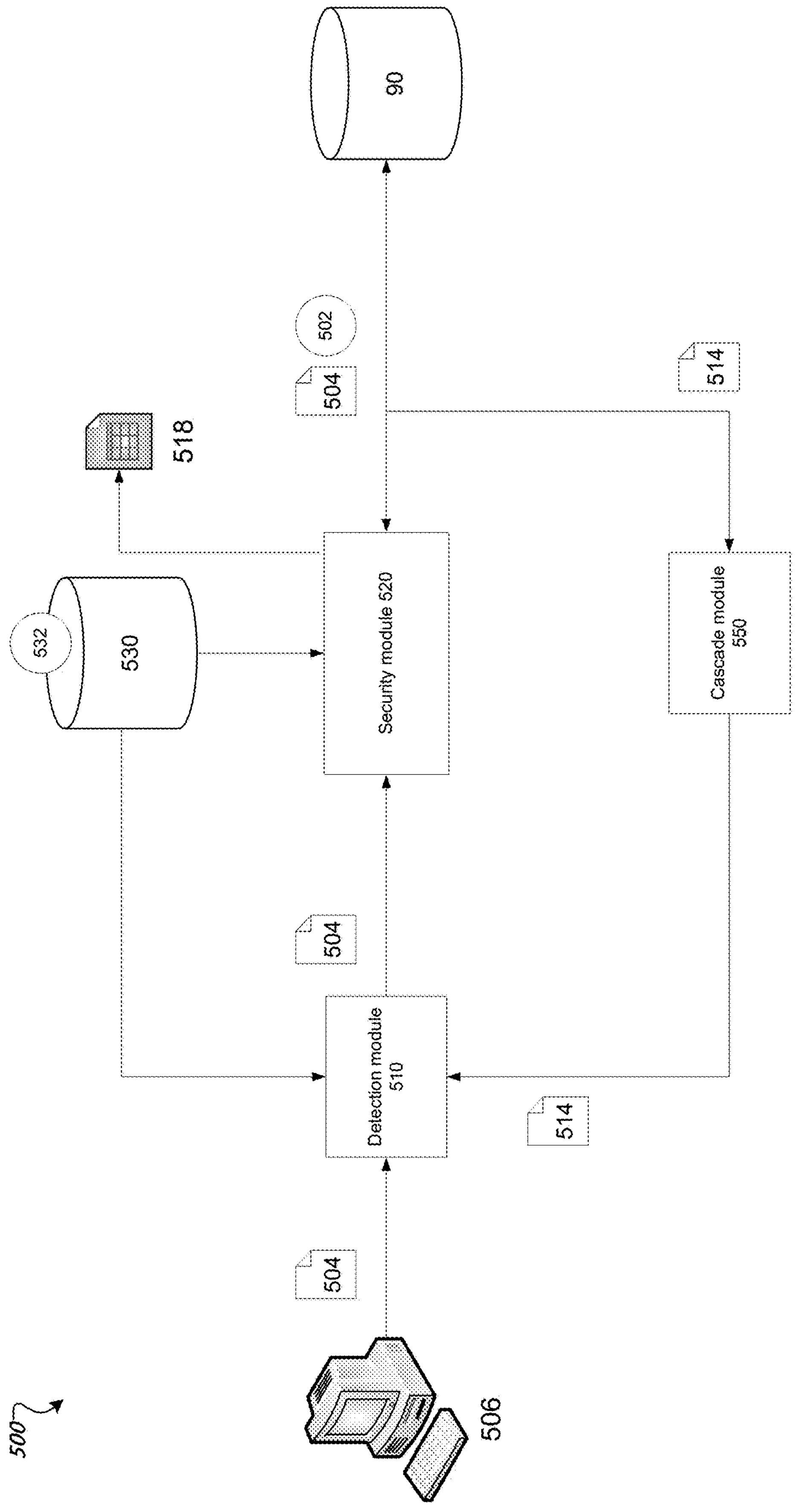
FIGS. 3 and 4 are block diagrams.

Referring to FIG. 3, a system 500 can determine a security label 502 for a data record 504 that is input into a database 90 e.g., by a computer 506. The data record 504 can be a new data record that is added to the database 90 or can be an update to a data record that is already stored in the database 90.

A detection module 510 detects changes to attributes and foreign key relationships that may affect a component of the security label 502 of one or more data records in the database 90. The detection module 510 detects an incoming data record 504 and determines whether to route the data record 504 to a security module 520 for calculation of the security label 502 for the data record 504. For instance, if the data record 504 is a new data record, the detection module 510 automatically routes the data record 504 to the security module 520. If the data record 504 is an update to a previously stored data record, the detection module 510 determines whether the update to the data record may affect one or more components of the security label of the data record 504. Updates that may affect one or more components of the security label include, for instance, an update to an attribute of the data record that is used in determining a component of the security label; an update to a foreign key relationship according to which a component of the security label is determined; or another update. Updates that do not affect any components of the security label include, for instance, updates to attributes or foreign key relationships that are not used in the determination of the security label. If the detection module 510 determines that the update may affect the security label of the data record 504, the detection module 510 routes the updated data record 504 to the security module 520. If the detection module 510 determines that the update does not affect the security label of the data record, the detection module 510 can route the data record 504 directly to a cascade module 550 (described below), e.g., bypassing the security module 520.

In some examples, the detection module 510 can determine whether to route the incoming data record 504 to the security module 520 according to one or more rules 532 stored in a rules database 530, a rules file, or stored in another way. An example rule 532 can indicate that a new data record 504 is to be routed through the security module 520. An example rule can specify the attributes of data records in a particular table of the database 90 (e.g., the table in which the data record 504 is to be stored) that are used in the determination of a component of the security label for the data record, and indicate that an updated data record 504 having a change to one or more of the specified attributes is to be routed through the security module 520. An example rule can specify which field or fields of data records in a particular table of the database 90 (e.g., the table in which the data record 504 is to be stored) include foreign key values that relate the updated data record 504 to other data records, and indicate that an updated data record 504 having a change to one or more of the specified foreign key fields is to be routed through the security module 520. For instance, the rules 532 can indicate that a change in a foreign key value that may cause the data record 504 to relate to a different upstream data record triggers a routing through the security module 520, while a change in a foreign key value that may cause the data record 504 to relate to a different downstream data record causes the data record 504 to be routed directly to the cascade module 550.

The security module 520 determines a security label 502 for the incoming or updated data record 504. The security module 520 can determine the security label 502 based on the rules 532 stored in the rules database 530. Each table in the database 90 can have a respective set of one or more rules 532. The rules for a given table specify how each component of a security label is determined for each record in that table. The rules can identify, for each component of a security label, one or more of an attribute, a foreign key, and a constant that are to be used in determining the component of the security label. The rules can specify whether multiple values to be used in determining a given component are to be concatenated or treated as a hierarchical list or an ordered list. The rules can specify a default in the event that a nullable foreign key relationship is null, such as a specification of a default value for a component of the security label or an indication to ignore the null foreign key. Once the security label 502 is determined for the incoming or updated data record 504 according to the rules 532, the security label 502 is added to the data record 504 and the data record 504, including the security label 502, is stored in the database 90.

The data record 504 is also routed to the cascade module 550. The cascade module 550 determines which other records, such as downstream records, may need to have a security label recalculated as a result of the update to the data record 504. For instance, the cascade module 550 identifies downstream records 514 that are related to the data record 504, e.g., through a foreign key relationship, and routes those downstream records 514 to the security module 520 for a recalculation of the respective security labels, e.g., as described above. In some examples, the cascade module 550 can identify downstream related records 514 according to one or more rules 532 that identify foreign keys that relate the data record 504 to other, downstream data records.

Once a downstream data record 514 is processed by the security module 520, its security label is updated in the database 90 and the downstream data record 514 is routed to the cascade module 550 so that the security labels of downstream data records of that data record 514 can be recalculated. This cascade of security label recalculation can continue, e.g., until no further downstream data records are available.

The system 500 can perform security label recalculations when a data record is deleted from the database 90. The detection module 510 detects that the data record is to be deleted from the database 90 and routes the data record to the cascade module 550. The cascade module 550 determines which other records, such as downstream records, may need to have a security label recalculated as a result of the deletion of the data record. For instance, the cascade module 550 identifies downstream records 514 that are related to the data record, e.g., through a foreign key relationship, and routes those downstream records 514 to the security module 520 for a recalculation of the respective security labels, e.g., as described above.

In some examples, the security module 520 can maintain a log 518 of security label calculations. For instance, the log 518 can include an identifier of a data record whose security label was calculated or recalculated, a date of the change, a time of the change, a previous value of the security label, a reason for the change (e.g., an identification of an upstream related record that triggered the recalculation or an indication that the data record was new or updated), or other information, or a combination of any two or more of them.

Figure 4:
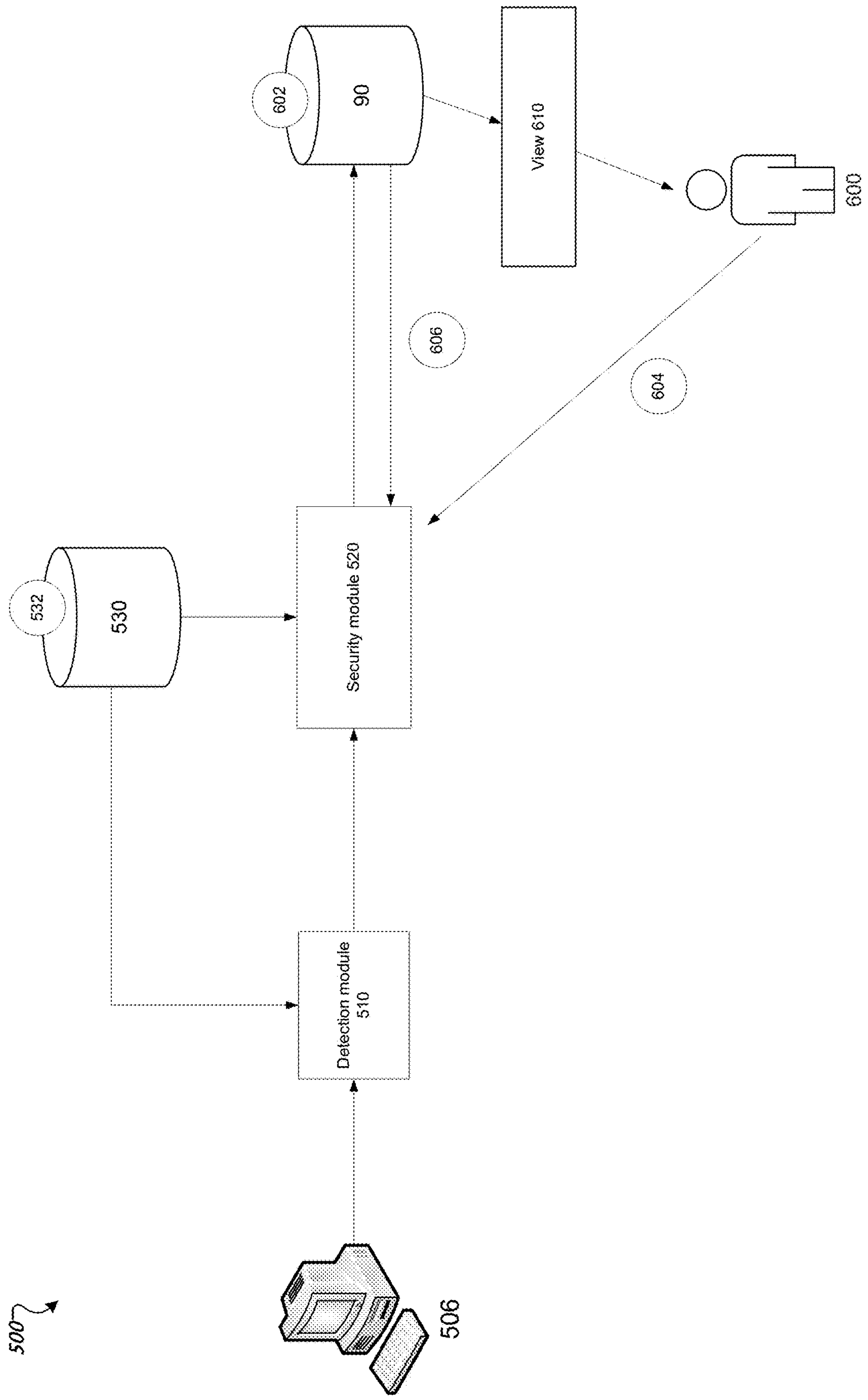

Referring to FIG. 4, the system 500 can respond to a request from a user 600 to access a data record 602 stored in the database 90. The user has a user security code 604. When the user 600 requests access to the data record 602, the security module 520 retrieves the security label 606 for the data record 602 from the database 90. The security module 520 can then compare each of the components of the security label 606 for the data record 602 with the corresponding component of the user's user security code 604 according to the rules 532. If each of the components of the user's user security code 604 satisfies the corresponding component of the security label 606, the user 600 is enabled to access the data record 602. If one or more of the components of the user's user security code 604 do not satisfy the corresponding component of the security label 606, the user is restricted from accessing the record. A view 610 can be presented to the user 600 that enables the user 600 to access the one or more data records 602 to which he is allowed access.

Figure 5:
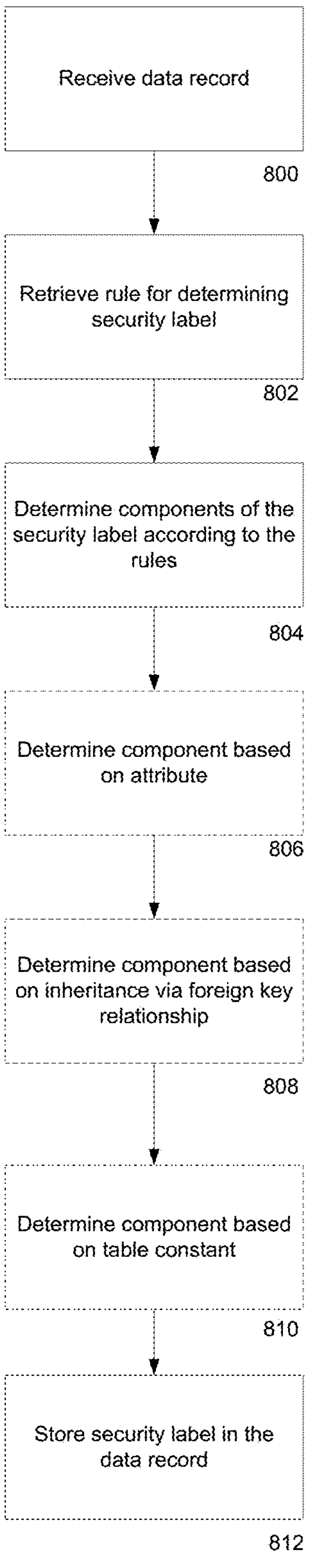
FIGS. 5-8 are flow charts.

Referring to FIG. 5, in a general approach to determining a security label for an incoming data record, a data record is received (800) for storage in a table of a database. One or more rules indicative of how the security label is to be determined for the data record are retrieved (802). Each component of the security label is determined according to the rules (804). The determination of a component of the security label can include determining the component of the security label based on an attribute of the data record (806). The determination of a component of the security label can include determining the component of the security label based on inheritance of a value from another data record related via a foreign key relationship (808). The determination of a component of the security label can include determining the component of the security label based on a constant value associated with the table (810). The security label is stored in a field in the data record (812).

Figure 6:
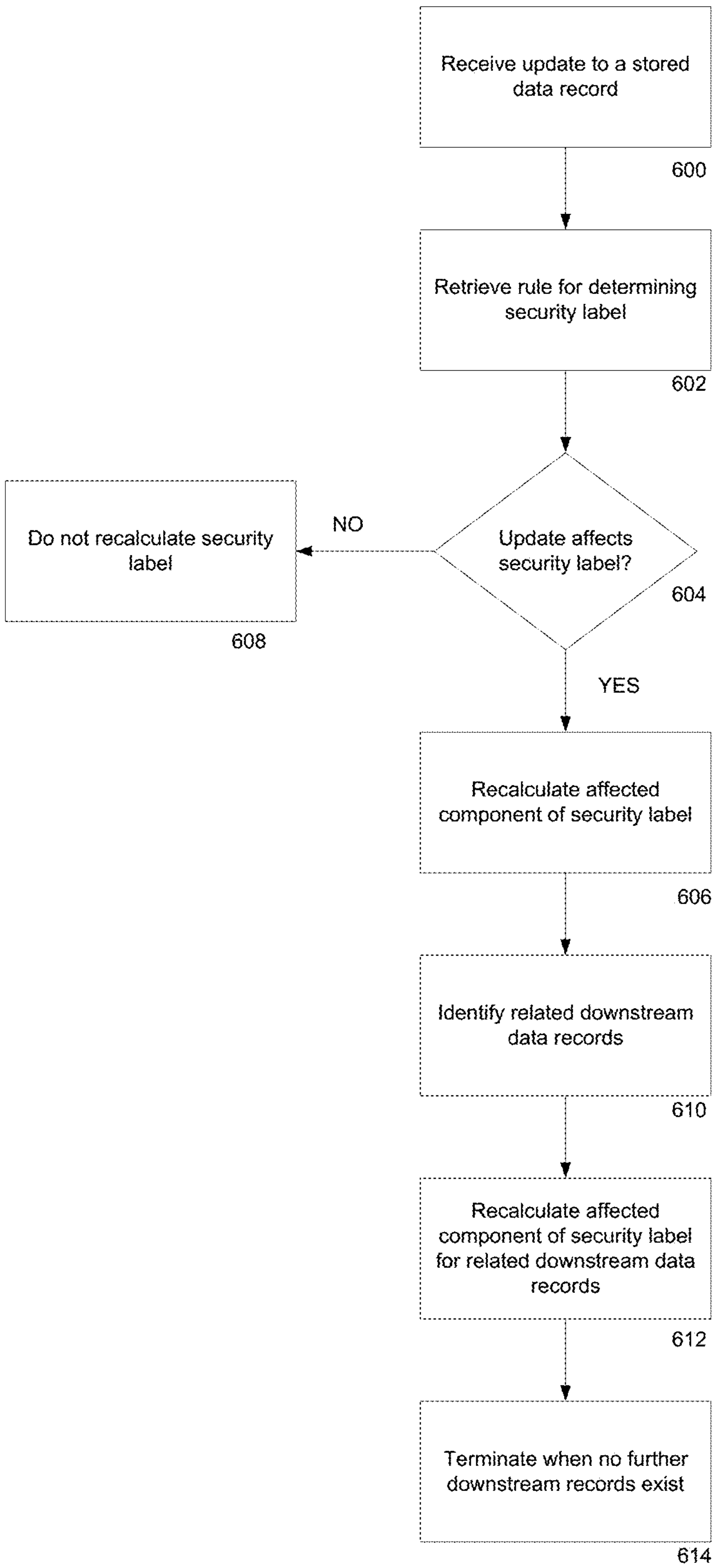

Referring to FIG. 6, in a general approach to updating a security label for a data record that has been updated, an update to a data record that is stored in a database is received (600). One or more rules indicative of how the security label is to be determined for the data record are retrieved (602). If the update affects an attribute that is used in determination of a component of the security label for the data record, or if the update affects a foreign key relationship between the updated data record and an upstream data record, or both (604), the affected component of the security label for the data record is recalculated (606), e.g., as described above. If the update does not affect any element of the data record that is used in the determination of a security label (604), the security label for the data record is not recalculated (608). Downstream related data records are identified (610). If the security label for the data record was recalculated or if the update affects a foreign key relationship between the updated data record and a downstream data record, the security calculation process is carried out for each of the downstream related records (612). When no further downstream records exist, the process terminates (614).

Figure 7:
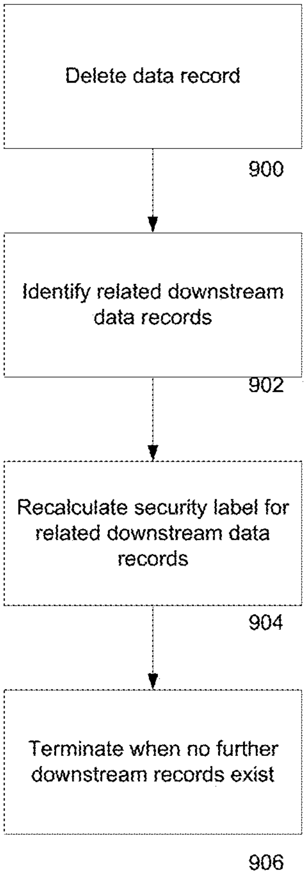

Referring to FIG. 7, in a general approach to deleting a data record from a database, a data record is deleted (900). Downstream related data records are identified (902). A component of the security label is recalculated for each of the downstream related records (904), e.g., as described above. When no further downstream records exist, the process terminates (906).

In some cases, the security label for a row controls which users are permitted to or restricted from reading the row. In some cases, the security label for a row controls which users are permitted to or restricted from writing to the row. In some cases, each row can have two security labels, one label that controls which users can read the row and another that controls which users can write to the row.

In some examples, such as those given above, a component of a security label for a row in a table is determined based on information in each of one or more related rows in another table. In some examples, a component of a security label for a row in a table can be determined based on information in each of one or more related rows in the same table. Determining a component of the security label for a row based on information in related rows in the same table can be performed when the relationships among rows in the table are not cyclical, such as when the relationships among rows are hierarchical.

In some examples, a component of a security label for a particular row in a table can be determined based on information in a row that is related to the particular row through a chain of multiple references, but not on information in the one or more intermediate rows in the chain of references. For instance, each row in a Table A can be related to a row in a Table B, and each row in Table B can be related to a row in a Table C. A component of the security label for each row in Table A can be determined based on information in the related row in Table C, but not on the information in the related row in Table B.

In some examples, the security label for each row in a table can be determined based on information in any related rows in the same table or in another table by default. In some cases, a user can override the default such that the security label for a row does not follow any foreign key relationship, or does not follow one or more particular foreign key relationships. In some examples, the security label for each row in a table can not follow any foreign key relationship by default. In some cases, a user can override the default such that the security label for each row in a table follows one or more particular foreign key relationships, or follows all foreign key relationships.

In some examples, the default approach to foreign key relationships can depend on the nature of the foreign key. For instance, if a particular foreign key is nullable, the default can be to not follow that foreign key relationship in determining a security label, while if the particular foreign key is not nullable, the default can be to follow that foreign key relationship in determining a security label. If a particular foreign key is not nullable but is null nonetheless, a fallback security label can be specified, such as a most restrictive security label, a most frequently used security label, a user specified security label, or another security label.

In some examples, all tables in a database are subject to row-level security, e.g., row-level security that is based on information external to the table. In some examples, only some of the tables in a database are subject to row-level security.

In some examples, column-level security can be provided in a manner similar to that described above with respect to row-level security. For instance, an additional row can be provided in the table to include a column-level security label. The values for fields in the column-level security row can be based on information external to the table, information internal to the table, or both.

In some examples, row-level security can propagate through various object classes, such as hierarchical object classes in a database. For instance, row-level security can apply at a database level, at a schema level, or at a table level, or at another level.

Figure 8:
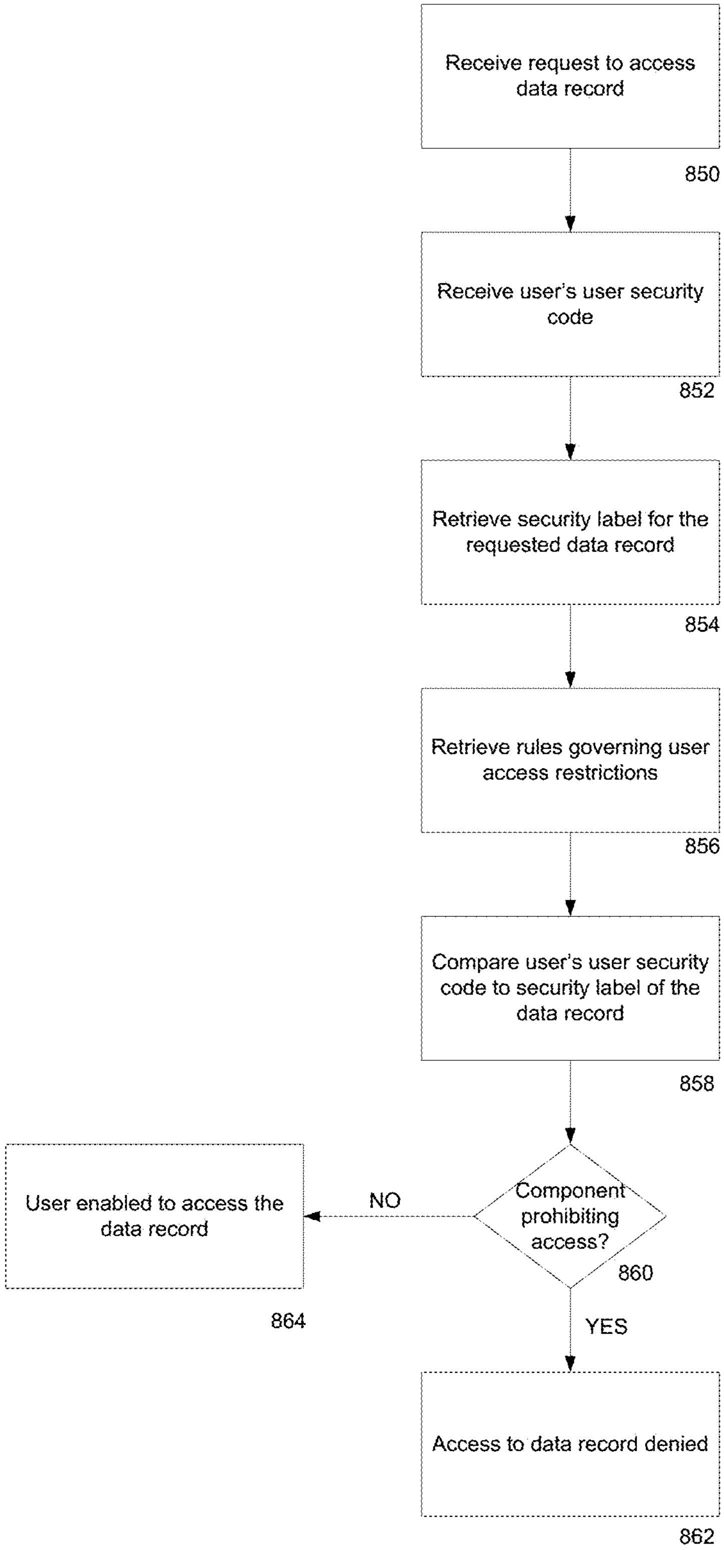

Referring to FIG. 8, in a general approach to determining whether a user is restricted from accessing a record, a request to access a data record is received from or on behalf of a user (850). The user's user security code is received (852), which can include one or more components. The security label for the requested data record is retrieved (854). One or more rules governing user access restrictions are retrieved (856) and each component of the user's user security code is compared to the corresponding component of the security label of the data record (858). If any component of the user's user security code prohibits access by the user to the data record (860), access to the data record is denied (862). If no component of the user's user security code prohibits access by the user to the data record (860), the user is enabled to access the data record (864).

Figure 9:
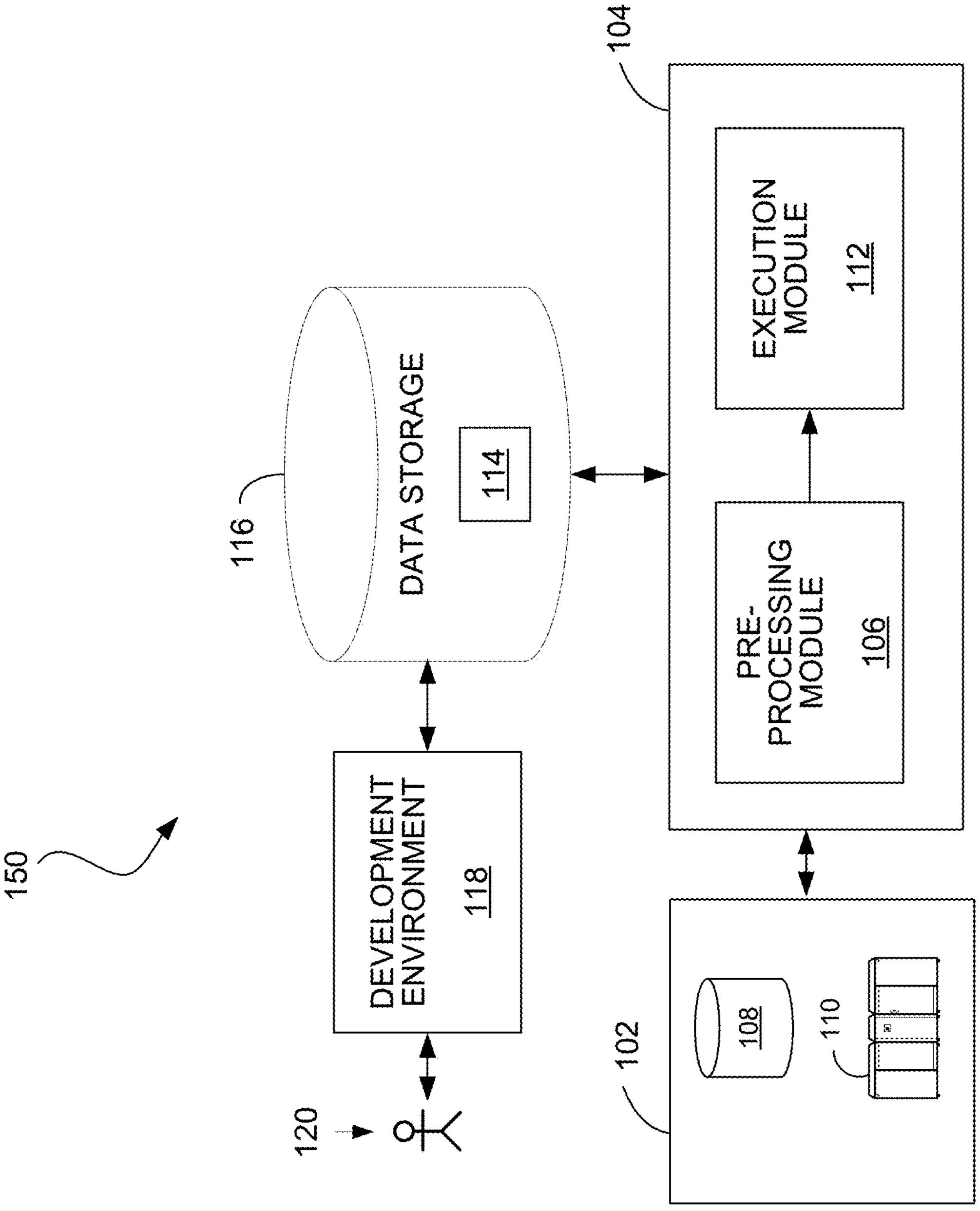
FIG. 9 is a block diagram.

Referring to FIG. 9, in some examples, the techniques described above can be implemented in a data processing system 150 that includes a data source 102 and an execution environment 104. The data source 102 may include one or more sources of data such as storage devices or connections to online data streams, each of which may store or provide data in any of a variety of formats (e.g., database tables, spreadsheet files, flat text files, or a native format used by a mainframe). The execution environment 104 includes a pre-processing module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), locally distributed (e.g., multiple processors coupled as clusters or massively parallel processing (MPP) systems), remote, remotely distributed (e.g., multiple processors coupled via a local area network (LAN) and/or wide-area network (WAN)), or any combination thereof.

The pre-processing module 106 reads data from the data source 102, performs any appropriate processing of the data, and stores the processed data. Storage devices providing the data source 102 may be local to the execution environment 104, for example, the data may be stored on a storage medium (e.g., hard drive 108) connected to a computer hosting the execution environment 104. The storage devices may also be remote to the execution environment 104, for example, being hosted on a remote system (e.g., mainframe 110) in communication with a computer hosting the execution environment 104 over a remote connection (e.g., provided by a cloud computing infrastructure).

The execution module 112 uses the processed data generated by the pre-processing module 106 to execute a specified process. The processing module 106 may output data 114 that may be stored back in the data source 102 or in a data storage system 116 accessible to the execution environment 104, or otherwise used. The data storage system 116 is also accessible to a development environment 118 in which a developer 120 is able to develop data processing applications. The development environment 118 is, in some implementations, a system for developing applications as computation graphs or dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications" A system for executing such graph-based computations is described in U.S. Pat. No. 5,966,072, titled "EXECUTING COMPUTATIONS EXPRESSED AS GRAPHS." Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The dataflow graphs developed using the development environment 118 can be stored in, e.g., the data storage 116 and accessed by the execution environment 104. The execution environment 104 may execute the dataflow graphs to carry out processes associated with the components of the dataflow graphs to process the data received from the data source 102.

The approach to generating connections described above can be implemented using a computing system executing suitable software. For example, the data processing system 100 can be implemented using a computing system having one or more data processors that execute instructions. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:

automatically determining a first component of a security label for a first record in a table of a database having multiple tables, including:

identifying a component of a security label for a second record related to the first record according to a first foreign key relationship, in which the component of the security label for the second record comprises a value in a field of the second record; and assigning a value for the first component of the security label for the first record based on the identified component of the security label for the second record;

combining the first component of the security label for the first record with a second component of the security label for the first record into a single element that includes the first component and the second component to form the security label for the first record;

storing the security label for the first record in one or more fields of the first record, wherein the security label is for managing access to the data stored in the fields of the first record;

determining that a trigger event has occurred, the trigger event comprising a modification to the first record that changes the first foreign key relationship relating the second record to the first record such that the first record relates to a different record; and responsive to determining that the trigger event has occurred, changing the value for the first component of the security label for the first record based on a component of a security label for the different record to which the first record relates due to the modification to the first record.

2. The method of claim 1, including determining the second component of the security label for the first record based on an attribute of the first record.

3. The method of claim 1, including determining the second component of the security label for the first record based on an attribute of the table of the database.

4. The method of claim 1, including determining the second component of the security label for the first record based on a component of a security label for a third record related to the first record by a second foreign key relationship.

5. The method of claim 1, in which combining the first component of the security label for the first record with the second component of the security label for the first record includes concatenating the first component of the security label for the first record and the second component of the security label for the first record.

6. The method of claim 1, including:

identifying a component of a security label for each of multiple second records each related to the first record according to a respective foreign key relationship; and assigning the value for the first component of the security label for the first record based on a value for the identified component of the security label for each of the second records.

7. The method of claim 1, including automatically determining the first component of the security label for a particular first record when the first record is received for storage in the database.

8. The method of claim 1, including:

determining that the modification to the first record causes one or more downstream records to relate to the first record by respective foreign key relationships; and updating a value for a component of a security label for each identified downstream record based on one or both of the first component of the security label for the first record and the second component of the security label for the first record.

9. The method of claim 1, wherein the stored security label is for facilitating an audit of the database.

10. A non-transitory computer readable medium storing instructions for causing one or more processors to perform operations including:

automatically determining a first component of a security label for a first record in a table of a database having multiple tables, including:

identifying a component of a security label for a second record related to the first record according to a first foreign key relationship, in which the component of the security label for the second record comprises a value in a field of the second record; and assigning a value for the first component of the security label for the first record based on the identified component of the security label for the second record;

combining the first component of the security label for the first record with a second component of the security label for the first record into a single element that includes the first component and the second component to form the security label for the first record;

storing the security label for the first record in one or more fields of the first record, wherein the security label is for managing access to the data stored in the fields of the first record;

when a trigger event occurs, the trigger event comprising a modification to the first record that changes the first foreign key relationship relating the second record to the first record such that the first record relates to a different record:

changing the value for the first component of the security label for the first record based on a component of a security label for the different record to which the first record relates due to the modification to the first record.

11. The non-transitory computer readable medium of claim 10, in which the operations include determining the second component of the security label for the first record based on an attribute of the first record.

12. The non-transitory computer readable medium of claim 10, in which the operations include determining the second component of the security label for the first record based on an attribute of the table of the database.

13. The non-transitory computer readable medium of claim 10, in which the operations include determining the second component of the security label for the first record based on a component of a security label for a third record related to the first record by a second foreign key relationship.

14. The non-transitory computer readable medium of claim 10, in which combining the first component of the security label for the first record with the second component of the security label for the first record includes concatenating the first component of the security label for the first record and the second component of the security label for the first record.

15. The non-transitory computer readable medium of claim 10, in which the operations include:

identifying a component of a security label for each of multiple second records each related to the first record according to a respective foreign key relationship; and assigning the value for the first component of the security label for the first record based on a value for the identified component of the security label for each of the second records.

16. The non-transitory computer readable medium of claim 10, in which the operations include automatically determining the first component of the security label for a particular first record when the first record is received for storage in the database.

17. The non-transitory computer readable medium of claim 10, in which the operations include:

determining that the modification to the first record causes one or more downstream records to relate to the first record by respective foreign key relationships; and updating a value for a component of a security label for each of the one or more downstream records based on one or both of the first component of the security label for the first record and the second component of the security label for the first record.

18. The non-transitory computer readable medium of claim 10, wherein the stored security label is for facilitating an audit of the database.

19. A computing system including one or more processors coupled to a memory, the one or more processors and memory configured to perform operations including:

automatically determining a first component of a security label for a first record in a table of a database having multiple tables, including:

identifying a component of a security label for a second record related to the first record according to a first foreign key relationship, in which the component of the security label for the second record comprises a value in a field of the second record; and assigning a value for the first component of the security label for the first record based on the identified component of the security label for the second record;

combining the first component of the security label for the first record with a second component of the security label for the first record into a single element that includes the first component and the second component to form the security label for the first record;

storing the security label for the first record in one or more fields of the first record, wherein the security label is for managing access to the data stored in the fields of the first record;

when a trigger event occurs, the trigger event comprising a modification to the first record that changes the first foreign key relationship relating the second record to the first record such that the first record relates to a different record:

changing the value for the first component of the security label for the first record based on a component of a security label for the different record to which the first record relates due to the modification to the first record.

20. The computing system of claim 19, in which the operations include:

determining that the modification to the first record causes one or more downstream records to relate to the first record by respective foreign key relationships; and updating a value for a component of a security label for each identified downstream record based on one or both of the first component of the security label for the first record and the second component of the security label for the first record.

* * * * *